United States Patent [19]

Driscoll et al.

[11] Patent Number: 4,685,020

[45] Date of Patent: Aug. 4, 1987

[54] SHUTDOWN CIRCUIT FOR BLOCKING OSCILLATOR POWER SUPPLY

[75] Inventors: Carleton D. Driscoll; Elie M. Najm, both of Cary; Manfred Waechter, Raleigh, all of N.C.

[73] Assignee: International Business Machines Corp., Armonk, N.Y.

[21] Appl. No.: 730,897

[22] Filed: May 6, 1985

[51] Int. Cl.[4] .............................................. H02H 3/20
[52] U.S. Cl. ........................................ 361/18; 361/90
[58] Field of Search ..................... 361/18, 93, 94, 98, 361/100, 101, 90, 106, 91, 88, 86, 87; 365/56

[56] References Cited

U.S. PATENT DOCUMENTS

| | | | |
|---|---|---|---|
| 3,624,490 | 11/1971 | Fisher | 361/101 |
| 3,697,861 | 10/1972 | Frazier | 361/98 X |
| 3,899,718 | 8/1975 | Schäff | 361/98 |
| 3,911,352 | 10/1975 | Slack | 361/18 X |
| 3,987,342 | 10/1976 | Bird et al. | 361/106 |
| 4,024,437 | 5/1977 | Suzuki | 361/88 X |
| 4,513,341 | 4/1985 | Kollanyi | 361/18 X |
| 4,513,343 | 4/1985 | Ryczek | 361/18 X |
| 4,528,608 | 7/1985 | Andersson et al. | 361/18 |
| 4,562,548 | 12/1985 | Andersen et al. | 361/18 X |

Primary Examiner—A. D. Pellinen
Assistant Examiner—A. Jonathan Wysocki
Attorney, Agent, or Firm—Joscelyn G. Cockburn

[57] ABSTRACT

A protective circuit arrangement is provided for shutting down a power supply at the occurrence of a fault condition. The circuit arrangement allows current limiting in a switching transistor during a power on and/or power off cycle, but shuts down the power supply if current limiting occurs at any other time.

2 Claims, 5 Drawing Figures

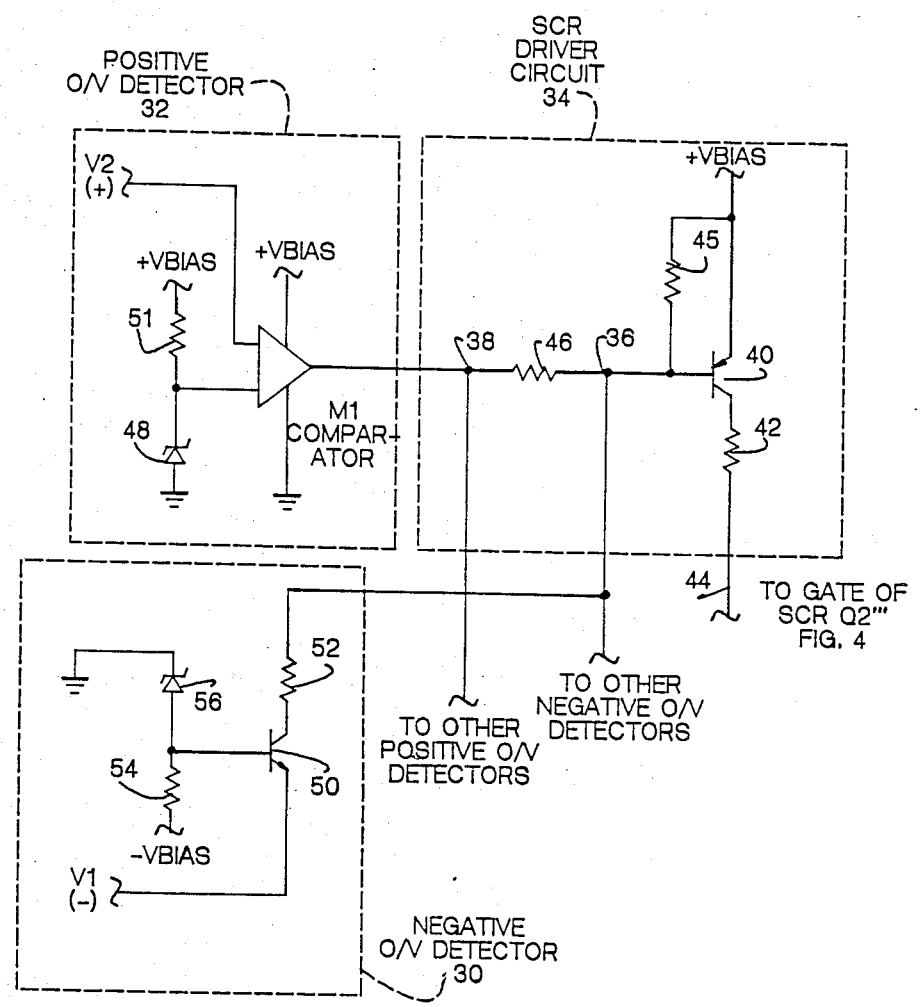

SHUTDOWN CIRCUIT FOR BLOCKING OSCILLATOR POWER SUPPLY

BACKGROUND OF THE INVENTION (1) Field of the Invention

The present invention relates to power systems in general and more particularly to circuitry for protecting said power systems from electrical faults.

(2) Prior Art

The use of power systems for driving various types of machine or loads is well known in the prior art. Of the various type prior art power systems, the switching regulator type power system is well suited for driving different types of industrial loads, machines, etc. The switching power system usually includes a switching transistor whose on-time cycle is controlled so that adequate power is delivered to the output load. Generally, the output load is coupled to the switching transistor through a power transformer.

Most power systems, be it of the switching regulator type or otherwise, are susceptible to damages due to electrical faults. The electrical faults may include a short circuit condition, an undervoltage condition, an overload condition, etc. Also, the electrical fault may occur in the power system and/or in the load. The utilization of protective circuitry as a means of protecting power systems from electrical faults is well known in the prior art. Various types of protective circuitry have been prepared and have been used to protect power systems.

A frequently used conventional technique for protecting power systems is that the power system is forced into operating at a low duty cycle (relaxation mode)when an electrical fault such as an overload occurs. In this mode of operation the power system outputs short bursts of current at a low repetition rate. Although the average output power drops to a relatively low level, the peak output current may be quite high. Usually, this method of protection works well in power supply whose rating is less than 30 watts. However, when the technique is used to protect a higher rating power supply, two problems arise. First, the high peak output may cause damage to the load even though the average power is low. Second, for a switch mode power supply, the power dissipation in the switching transistor base drive resistor becomes unacceptable. U.S. Pat. No. 4,447,841 is an example of the prior art wherein the mode of operation is switched when a fault condition occurs.

In order to provide for high power applications the base drive resistor that is usually present in the base lead of the switching transistor is replaced with an inductive device. Utilization of the inductive base drive technique is shown and described in an article entitled "Driver Circuit for Switching Regulator," by J. K. Radcliffe in the IBM Technical Disclosure Bulletin (Vol. 24, No. 11A, April 1972, pages 5501-5503). Although the inductive base drive technique provides an improvement over the prior art, it does not work well if a series capacitor is used with the inductor. As a result, the relaxation mode technique is not a suitable protection method for a higher rating power supply.

Current limiting is another conventional technique used in protecting power supplies. In this technique a relatively low value resistor is placed in the emitter lead of the switching transistor and circuitry is added to monitor the resistor voltage. Whenever the resistor voltage reaches a predetermined value, the switching transistor is turned off. Thus, a limit is placed on the peak current through the switching transistor by choosing the right resistor.

The general problem with the current limiting technique is that during "start-up" and/or "turn-off" the "on-time" of the switching transistor will be determined by the current limiting circuit. If the power supply is overloaded, etc., the current limiting circuit becomes effective. This provides protection for the switching transistor but it allows the entire output power capability of the supply to be delivered to the load. Some form of current limiting is practiced in U.S. Pat. Nos. 4,020,395; 4,156,273 and 4,428,015.

Still other types of protection schemes are given in U.S. Pat. Nos. 4,330,816; 3,931,567; 3,987,342 and 4,024,437. In these circuits different parameters are measured and if the measurement falls outside of a desired range, adjustment is made by controlling the switching transistor.

SUMMARY OF THE INVENTION

It is the object of the present invention to protect a power system in a more efficient manner than was heretofore possible.

This is done by providing a circuit arrangement that turns off or shuts down the power supply if an electrical fault occurs. However, if an electrical interruption (such as an electrical outage, etc.) occurs on the input lines, the circuit includes an auto restart feature that enables it to be restarted without external interference (i.e., automatically).

The circuit arrangement includes a current limiting circuitry that is provided for the switching transistor. A circuitry for providing holding current is coupled to the current limiting circuitry. A control circuitry is coupled to the holding current circuit. During the power-on and/or power-off cycle, the holding circuitry is disabled by the control circuitry. This allows the current limiting circuitry to control the current flowing through the switching transistor. If the peak current becomes too high, the switching transistor is turned off.

For all other times, if current limiting occurs, the control circuitry allows the holding circuit to deliver current to the current limiting circuitry. As a result, the power supply is turned off and stays off until restarted using the power on switch.

In one feature of the invention, a short circuit condition is created in the secondary winding of the power transformer. This causes an excessive current to flow through the switching transistor. This in turn triggers current limiting and as a result the power supply is shut down.

In another feature of this invention a properly biased transistor is used to measure or detect a negative overvoltage.

BRIEF DESCRIPTION OF THE DRAWINGS

FIG. 5 shows a circuitry for measuring positive and/or negative overvoltage.

DETAILED DESCRIPTION OF THE PREFERRED EMBODIMENT

Although the present protection circuitry can be used for protecting any type of power systems or power supplies, it works well with a switching type power supply. As such the invention will be described in this environment. However, this should not be construed as a limitation on the scope of the invention since it is well within the skill of one skilled in the art to make minor changes to the disclosed circuitry and personalize its use to protect the power supply with any type of topology.

In an attempt to simplify the description of the present invention, a common alphanumeric notation will be used to describe common components in the various views of the drawings. However, in order to identify the components that belong to specific views of the drawings, a prime, double prime etc. notation will be used with the common alphanumeric notation. To this end, the components of FIG. 1 will be identified with an unprimed set of alphanumeric notation. The components which are similar in FIG. 2 will be identified with primed alphanumeric notations. The prime notation signifies that these components are used in FIG. 2 drawing. Similarly, double prime notation will be used to identify the components in FIG. 3, and so on.

Figure 1:
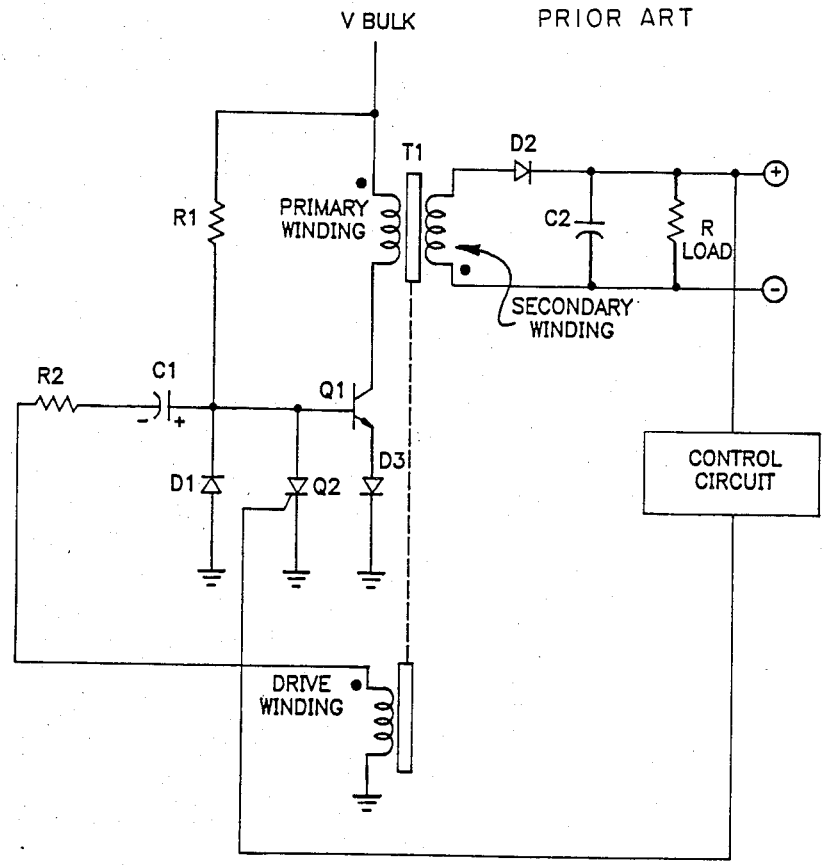
FIG. 1 shows a schematic for a switching type power supply.

FIG. 1 show a schematic for a switching type power supply. The power supply includes a switching transistor Q1 whose emitter is tied through a diode D3 to ground. One end of the primary winding of a power transformer T1 is tied to the collector terminal of Q1. The other end of the primary winding T1 is tied to a supply voltage ($V_{bulk}$). A start resistor R1 connects the base of switching transistor Q1 to the supply voltage. A drive winding is provided on the core of the power transformer. One end of the drive winding is tied through resistor R2 and capacitor C1 to the base of the switching transistor Q1. The other end of the drive winding is tied to ground potential.

A diode D1 is connected between ground and the base of transistor Q1. A secondary winding is provided on the core of power transformer T1. A rectifying circuit comprising of diode D2 and capacitor C2 is connected across the ends of the secondary winding. A load identified by alphabetic character R is connected across capacitor C2. A feedback loop comprising of a control circuit and silicon controlled rectifier (SCR) Q2 interconnects the positive side of the load to the base of switching transistor Q1. The details of the control circuit need not be given since there is a variety of well-known control circuitry which can be used to control the on-time characteristics of Q1.

Still referring to FIG. 1, $V_{bulk}$ is an unregulated DC voltage obtained by rectifying and filtering signals from an AC power line (not shown). $V_{bulk}$ is usually within the range from 100 V to 400 V. In operation, the circuit is started by resistor R1 which provides current from $V_{bulk}$ supply source to charge capacitor C1. When the voltage on C1 reaches the base-emitter threshold of Q1, current begins to flow in the base of Q1 and this device is turned on. As a result, the above voltage appears across the primary winding of power transformer T1. By transformer action a voltage appears across the drive winding. The polarity of the voltage across the drive winding is such that it reinforces the current already flowing in the base of switching transistor Q1. Simultanteously, a voltage also appears on the secondary winding of T1. However, the polarity of the voltage on the secondary winding is such that no secondary current can flow. The current from the drive winding is set by resistor R2. This current is many times greater than the start-up current from R1 and it tends to charge C1 in the opposite direction. The time required for the power supply to start its first cycle depends on the time constant R1, C1.

In a typical configuration R1 is made to be several time larger than R2, usually 100K to 1 megaohm. After the first cycle, R1 has no further effect since C1 is then charged through R2. After a few cycles the voltage across C1 reaches equilibrium with the polarity shown. While Q1 remains on, energy is being stored in transformer T1. When the control circuit decides that sufficient energy has been stored, it turns on SCR Q2. This causes Q1 to turn off. Since the primary of T1 acts as an inductor, it will generate a voltage of the opposite polarity in an attempt to continue the current flow. By transformer action the drive winding voltage will also change polarity. This causes current to flow in diode D1, which reverse biases the base of Q1 and turns off Q2. It also recharges C1 in the original direction. The secondary rectifier diode D2 now becomes forward bias and the energy that was stored in T1 is transferred to the load. This condition continues until all of the energy in T1 has been transferred. Then a new cycle is started.

Figure 2:
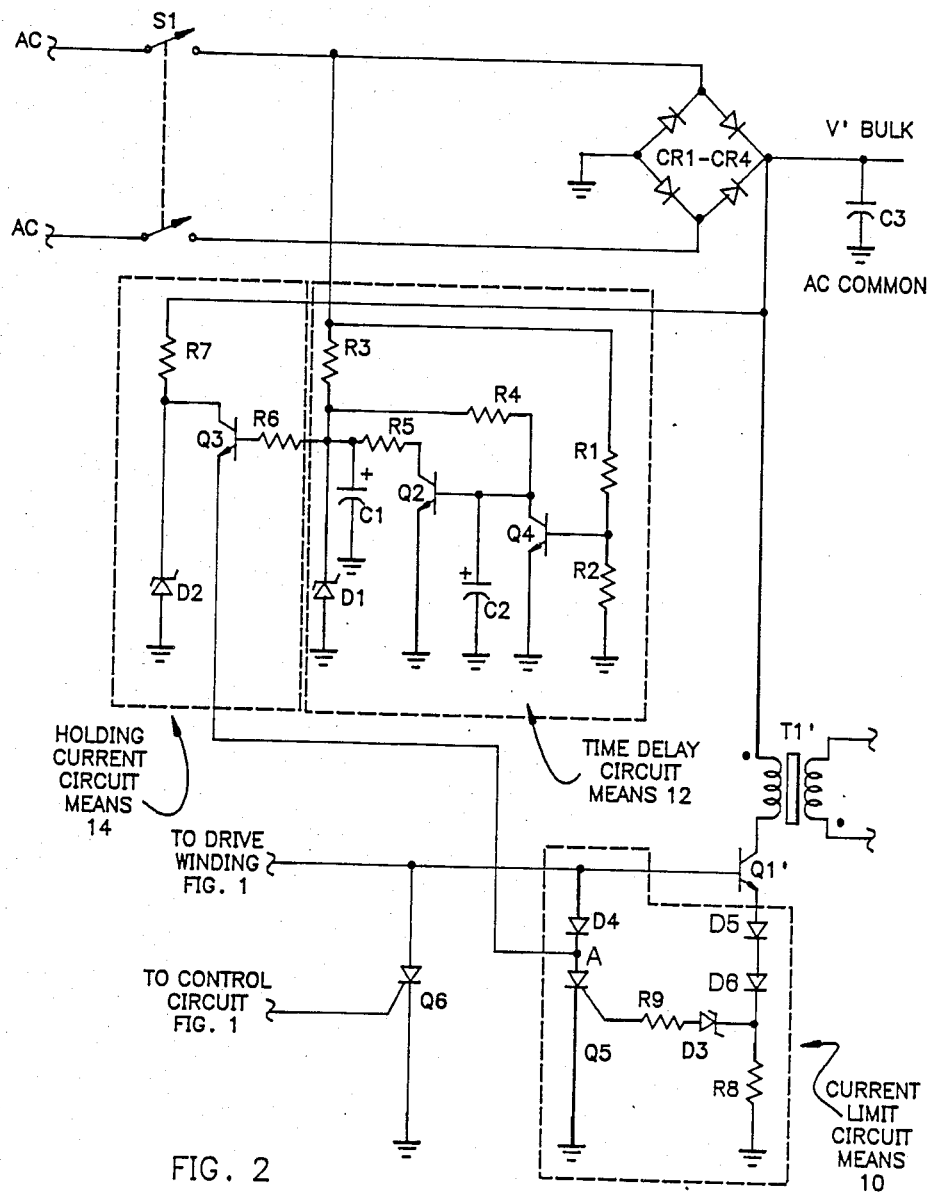
FIG. 2 shows a schematic for a power supply embodying the shutdown circuit of the present invention.
Figure 3:
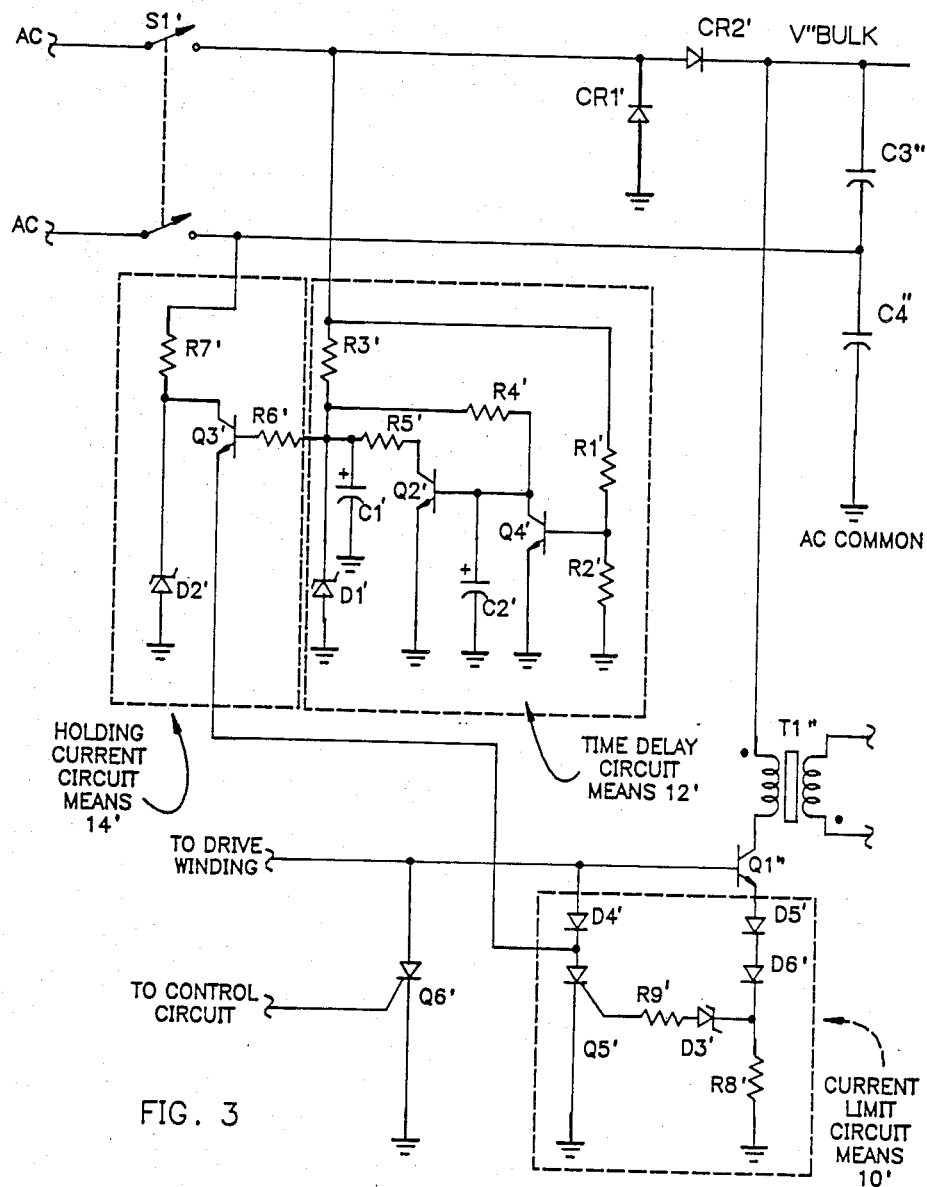
FIG. 3 shows the shutdown circuit with a voltage doubler generating the bulk voltage.

FIGS. 2 and 3 show a schematic of a switching type power supply embodying the shutdown circuit of the present invention. As was stated above, $V_{bulk}$ is an unregulated DC voltage obtained from rectifying and filtering signals on the AC power line. In FIG. 2 the V' bulk is generated from a diode bridge CR1-CR4 and a capacitor C3 is connected between the diode bridge and ground. Likewise, in FIG. 3 $V''_{bulk}$ is supplied by diodes CR1' and CR2'. A pair of capacitors C3" and C4" are connected in series and in turn connected between diode CR2' and ground.

Still referring to FIGS. 2 and 3, the shutdown circuit arrangement according to the teaching of the present invention comprises of current limit current means 10 and 10' time delay circuit means 12 and 12' and holding current circuit means 14 and 14'. It is worthwhile noting that the prime numerals identify the components in FIG. 3. As will be explained subsequently, the function of current limit circuit means 10 and 10' is to monitor the flow of current through switching transistor Q1' and Q1", respectively, and when the current limit reaches beyond a maximum peak, the switching transistor is turned off by the current circuit means.

The holding current circuit means 14 and 14' ensures that once the current limit circuit means is activated, holding current continues to be supplied to SCR Q5 and Q5'. As a result, the power supply remains off until it is reset via power switch S1 or S1'. The time delay circuit means 12 and 12' function as a control circuit and inhibits the holding current circuit means from supplying holding current during the start-up and/or shutdown cycle of the power supply. Likewise, the auto start circuit of the present invention is included in the holding current circuit means 14 and 14'. This auto start feature is provided by resistor R7 and R7' and by transistor Q3 and Q3'. These components supply holding current to SCR Q5 and Q5' as long as the AC power line voltage is present. When the AC line is interrupted, holding current can no longer flow. SCR Q5 and Q5' then turns off. When AC power is later restored, the power supply will restart in the usual manner. If a fault is still present, shutdown will occur after the start-up delay provided by the time delay circuit. If no fault is present, the power supply will operate normally.

Still referring to FIGS. 2 and 3, the current limit circuit means 10 and 10' includes diode D4 and D4' with its anode connecting to the base of Q1',Q1" and the cathode connected to the anode of SCR Q5 and Q5'. In order to simplify the description, reference will be made to the components in FIG. 2 only, it being understood that similar components in FIG. 3 are identified by prime designation and perform identical functions. One terminal of SCR Q5 is tied to ground and the other gate is connected via resistor R9 to the anode of zener diode D3. The cathode electrode of the zener diode D3 is tied through resistor R8 to ground. Diodes D5 and D6 connect the emitter of Q1' to zener diode D3 and resistor R8. An SCR identified by Q6 is tied between the base of Q1' and ground. One electrode (anode) of SCR Q6 is tied to the drive winding in FIG. 1 while another electrode (gate) is tied to the control circuit in FIG. 1. As will be explained subsequently, diode D4 isolates SCR Q5 and Q6, respectively. This is necessary so that when Q5 is operating in a holding state, holding current is not fed back into Q6. D4 also isolates Q5 from the rest of the drive circuit. The value of R8 is usually low, say 5 ohms or less.

The voltage across resistor R8 has the same waveform as current in Q1'. When the voltage across R8 is of a sufficient magnitude to cause D3 to conduct, Q1' is turned off and conduction will take place through Q5. By selecting the proper value for D3 and R8, a limit on the current which flows through Q1' can be set. It should be noted that during normal operation the control circuit (FIG. 1) will turn on Q6 and as a result turn off the switching transistor Q1' before current limit is reached.

Still referring to FIGS. 2 and 3, the holding current circuit means 14 keeps current flowing through SCR Q5 if there is an overcurrent at any other time than at the start-up or shutdown of the power supply. To this end, the holding current circuit means 14 includes a switching transistor Q3. A resistor R6 connects the base of transistor Q3 to the output of time delay circuit means 12. The details of time delay circuit means will be given shortly. Suffice it to say at this point that the time delay circuit means 12 ensures that the holding current circuit means 14 is disabled during power-up and/or power down cycle of the power supply. The time delay circuit means 12 also provides the auto start feature of the present invention. The emitter of transistor Q3 is connected to node A while the collector transistor Q3 is tied to ground through zener diode D2 and is tied through resistor R7 to V' bulk.

Time delay circuit means 12 controls the holding current circuit means 14. It includes a pair of switching transistors Q2 and Q4. The base of transistor Q2 is tied to the collector lead of transistor Q4. Capacitor C2 is connected between the base of transistor Q2, the collector of transistor Q4 and ground. A pair of series connected resistors R3 and R5 ties the collector lead of transistor Q2 to R1. Zener diode D1 connects the collector of transistor Q2 to ground through resistor R5. Similarly, capacitor C1 is coupled between ground and the collector terminal of transistor Q2 through resistor R5. Resistor R4 interconnects the collector of transistor Q4 to resistor R3. A voltage divider formed by R1 and R2 connects the base of transistor Q4 to ground and to the AC line. Switch S1 interconnects the bulk generating voltage to the AC power lines.

It is normal for the blocking oscillator to operate in primary current limit mode during the power on and off cycles because the control circuit is not active during these periods. The time delay circuit means 12 is needed for this reason. The time delay circuit operates as follows: When switch S1 is closed, current flows through resistor R1 to the base of transistor Q4. Q4 turns on, thus turning off Q2. This allows capacitor C1 to charge through R3 until its voltage is clamped by D1. The R3, C1 time constant is made long enough so that the period of current limit during power on will be over before C1 is charged. Although pulsating the voltage at the load side of S1 is always positive with respect to AC common. Each time the voltage goes to 0, Q4 will turn off. Before Q2 can turn on, C2 must be charged by current from R4. This time constant is made long enough so that Q2 will remain off until Q4 turns on again. Then C2 will be discharged again. When power is turned off (S1 open) Q4 will again turn off. C2 will be charged by C1 through R4 until Q2 turns on. Then C1 will be discharged through R5 and the circuit will be ready for the next power-on cycle. The time constants are selected so that C1 will be discharged before current limit occurs in the power-off cycle.

The holding current for Q5 is supplied from the bulk voltage ($V'_{bulk}$) through resistor R7 and transistor Q3. Q3 is held off by the time delay circuit means 12 during power-on and power-off times. The off-state voltage across Q3 is limited by zener diode D2 so that a high voltage transistor is not required. When the time delay has been completed, the base voltage at Q3 raises to the voltage of zener diode D1 and is thus ready to turn on when the path from the emitter to AC ground is completed. This will happen when Q5 turns on. Once turned on, Q5 will continue to receive holding current and will keep the power supply off as long as bulk voltage is present.

With reference to FIG. 3, it should be noted that the shutdown circuit will work with a voltage doubler means to generate the bulk voltage V''' bulk. In fact, the voltage doubler will allow the power dissipation of R7' to be reduced by connecting it to the common junction of the two filter capacitors C3" and C4" used in the voltage doubler. The current in R7' is determined by the holding current requirement of Q5' and must be the same whether or not a bridge (FIG. 2) or doubler circuit (FIG. 3) is used. The doubler allows R7' to be connected to a lower voltage point and thus lowers its power dissipation.

Figure 4:
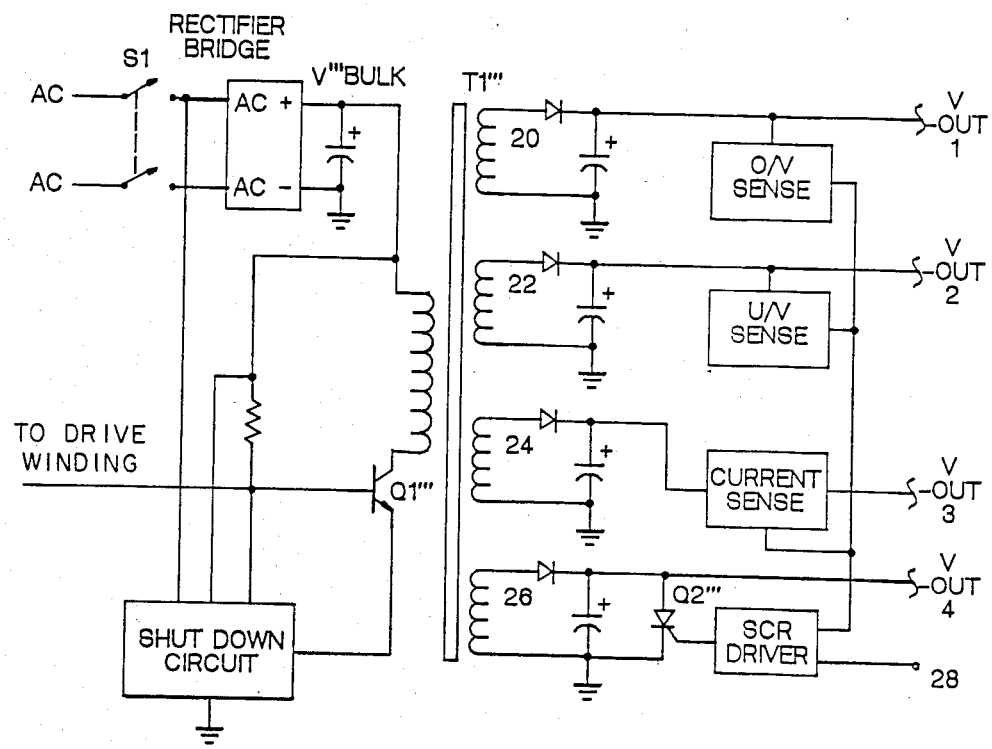
FIG. 4 shows a schematic of a circuit arrangement with the shutdown circuit being used to provide protection for fault occurring in the secondary windings of the power transformer.

The shutdown circuit previously described provides protection against any fault (such as short circuit on an output voltage, etc.) which can cause primary current limiting to occur. When used with other fault detection circuitry, it can provide protection against overvoltage and undervoltage. Also, it can limit output current to any value desired. FIG. 4 shows the schematic of an embodiment for implementing this overall protection. In the schematic a plurality of secondary windings 20-26 are mounted to the core of power transformer T1'''. As before, the primary winding has one of its end tied to switching transistor Q1''' while the other end is tied to V'''' bulk. A rectifier bridge circuit provides V'''' bulk. The shutdown circuit is connected to the switching transistor Q1''' and the AC power line in a manner similar to that previously described. The output signal from each secondary winding 20–26 is rectified via an appropriate circuit (such as a series connected diode/capacitive circuit) and is supplied as Vout1, Vout2, Vout3 and Vout4. An overvoltage (O/V) sensing means is provided to sense overvoltage conditions in Vout1. Similarly, undervoltage (U/V) sensing means is provided to sense undervoltage conditions in Vout2. A current sensing means is tied into Vout3 to sense an unusual current condition. The output from each of the sensing means is dot OR'ed into an SCR driver whose output is connected to SCR Q2'''. There are many well-known techniques and circuitry for sensing overvoltage (O/V), undervoltage (U/V) and overcurrent conditions. Therefore, a detailed description of a particular technique and/or circuitry will not be given here, it being understood that it is well within the skill of one skilled in the art to select one of the prior techniques and/or circuitry.

The outputs of all the fault detection circuits (FIG. 4) are coupled together such that if any fault occurs SCR Q2''' is activated (that is, turned on) and short circuit one of the power supply outputs. In FIG. 4 the short circuit condition occurs in coil 26. This will cause primary current limiting and the shutdown circuit will turn off the power supply. An advantage of this approach is that the secondary fault sensors (O/V sense means, U/V sense means, etc.) in the secondary windings can communicate with the shutdown circuit through the power transformer T1'''. No separte secondary to primary path such as an optical isolator or pulse transformer is needed. Also, this approach is not limited to fault sensing. The power supply can be made to shut down for any reason by simply inputting a control signal on the terminal 28 which activates SCR Q2''' and short circuit winding 26.

The power supply may be turned on and off as rapidly as possible without causing shutdown to occur.

This is because the time delay circuit discharges the timing capacitors C1 and C2 as soon as the AC power line is interrupted. Resistor divider R1, R2 is used to sense this interruption. When AC power is again applied, the capacitors always start from a discharged state. Thus, we always get the same time delay on start-up. If the capacitors were not completely discharged, the start-up delay would be reduced and shutdown would occur during the normal period of current limit during start-up.

This feature is important because without it the supply would be subject to nuisance shutdowns. The circuit is designed to reset faster than anyone could reclose the power on/off switch, S1.

FIG. 5 shows a schematic for a novel overvoltage detector which can be used in FIG. 4 to detect both a positive and a negative overvoltage condition. It should be noted that any other types of overvoltage sensing device can be used in FIG. 4. The overvoltage detector (FIG. 5) includes a negative overvoltage detector 30, a positive overvoltage detector 32, and an output circuit 34. The negative overvoltage detector 30 is connected at node 36 to the SCR driver circuit 34. If there are other overvoltage detectors, they are also connected to the output circuit at node 36. Similarly, the positive overvoltage detector 32 is coupled to the output circuit at node 38. If there are other positive overvoltage detectors, they are also connected to the output circuit at node 38.

The SCR driver circuit 34 includes a transistor 40. The collector lead of transistor 40 is coupled through resistor 42 to the gate of SCR Q2''' (FIG. 4), as previously described. With respect to FIG. 4, the conductor 44 would be dot OR'ed into the SCR driver. The emitter lead of transistor 42 is connected to a +Vbias voltage supply. Resistor 45 couples the base of transistor 40 to the emitter lead. Resistor 46 is placed in the base of transistor 40 and interconnects nodes 36 and 38, respectively.

The positive overvoltage detector 32 includes a comparator M1. The output from comparator M1 is tied to node 38. The comparator M1 has two power supply leads, one of which is tied to a positive Vbias voltage level, and the other is connected to ground. The negative input to the M1 comparator is connected to the voltage level (+V2) to be sensed. A reference voltage generated by zener diode 48 and resistor 50 is connected to the positive input of comparator M1.

The negative overvoltage detector 30 comprises of a transistor 50. The emitter of transistor 50 is coupled to the negative voltage (−V1) to be sensed. The collector of transistor 50 is coupled through resistor 52 to the SCR driver circuit 34. A negative reference voltage is established at the base of transistor 50 by resistor 54 and the zener diode 56. As stated before, the negative voltage to be sensed V1 is applied to the emitter of transistor 50. When the voltage to be sensed (that is, −V1) becomes more negative than the reference voltage at the base of transistor 50 by a base-emitter drop, transistor 50 will conduct and cause the SCR driver stage to produce a signal. Good accuracy can be obtained from the negative overvoltage detector 30 because in comparison with other known negative overvoltage detectors no resistor divider circuitries are used. Also, transistor 50 acts as a detector and a level shifter, thus eliminating the need for a separate comparator.

Having thus described our invention, what we claim and desire to secure as Letters Patent is as follows:

1. In a switching power supply having a switching transistor for controlling current through the primary winding of a power transformer and a plurality of secondary windings being arranged on the core of said power transformer said secondary windings operable for supplying current to attached loads, a circuit arrangement for protecting said power supply from electrical faults comprising:

shut down circuit means coupled to said switching transistor and operable for shutting down the power supply when the flow of current therethrough exceeds a predetermined limit;

first circuit means coupled to said secondary windings and operable for sensing a fault condition in said secondary windings and to generate electrical signals representative of said sensed fault, said first circuit means including a positive overvoltage (O/V) detector circuitry and a negative O/V detector circuitry with the negative O/V detector circuitry including a switching means having a plurality of leads with one of said leads providing an output signal, a second of said leads being coupled to a negative voltage to be sensed, a voltage divider circuit means being coupled to a third lead of said switching means, a second circuit means for sensing an undervoltage condition, a third circuit means for sensing unacceptable output current conditions with each one of said circuit being coupled to separate secondary windings;

fourth circuit means operable for combining the output from the first, second and third means and to generate a single output signal therefrom; and a fifth circuit means coupled to one of said secondary windings, said fifth circuit means being responsive to the output signal and operable for shorting said secondary windings whereby a surge of current exceeding the predetermined limit is made to flow through the switching transistor.

2. The circuit arrangement of claim 1 wherein the voltage divider circuit means includes a zener diode being connected in series with a resistive means.

* * * * *